United States Patent
Yeom et al.

(10) Patent No.: US 12,420,699 B2
(45) Date of Patent: Sep. 23, 2025

(54) METHOD AND APPARATUS FOR PROVIDING USER INTERFACE BASED ON PROJECTION

(71) Applicants: HYUNDAI MOTOR COMPANY, Seoul (KR); Kia Corporation, Seoul (KR)

(72) Inventors: Ha Kyung Yeom, Anyang-si (KR); Jae Hoon Chung, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 275 days.

(21) Appl. No.: 17/895,413

(22) Filed: Aug. 25, 2022

(65) Prior Publication Data
US 2023/0219483 A1    Jul. 13, 2023

(30) Foreign Application Priority Data
Jan. 7, 2022   (KR) .......................... 10-2022-0002626

(51) Int. Cl.
*B60Q 1/00*    (2006.01)
*B60K 35/10*   (2024.01)
(Continued)

(52) U.S. Cl.
CPC ............ *B60Q 1/0023* (2013.01); *B60K 35/10* (2024.01); *B60K 35/21* (2024.01); *B60K 35/60* (2024.01);
(Continued)

(58) Field of Classification Search
CPC .... B60Q 1/0023; B60Q 2400/50; B60R 1/20; B60R 25/305; B60R 25/31; B60R 2300/105; B60R 2300/8073
(Continued)

(56) References Cited

U.S. PATENT DOCUMENTS 11,199,853 B1 * 12/2021 Afrouzi .................. B25J 13/006
11,318,961 B2 *  5/2022 Kim ........................ B60R 11/04
(Continued)

FOREIGN PATENT DOCUMENTS

| EP | 3441725 A1 * | 2/2019 | ............. B60K 35/00 |
| EP | 3415394 B1 * | 3/2023 | ......... B60H 1/00985 |
| WO | WO-2015148611 A1 * | 10/2015 | ........... B60Q 1/0023 |

OTHER PUBLICATIONS

Hardy,John.ToolkitSupportfor Interactive Projected Displays.N.p. ,2014.Web. (Year: 2014).*

*Primary Examiner* — Ramya P Burgess
*Assistant Examiner* — Keith A von Volkenburg
(74) *Attorney, Agent, or Firm* — Morgan, Lewis & Bockius LLP

(57) ABSTRACT

A device for providing an interface using a projection includes: a first camera for capturing a vehicle user when an approach of the vehicle user to a vehicle is detected; a projector for projecting an interface, related to at least one vehicle control function, preset based on user identification information; a second camera for capturing an area on which the interface is projected; a memory storing one or more instructions; and a processor for executing the instructions to: acquire the user identification information of the vehicle user using the first camera, recognize a user input to the interface using the second camera, and perform a vehicle control corresponding to the interface when the user input is recognized.

19 Claims, 10 Drawing Sheets

(51) Int. Cl.
  *B60K 35/21* (2024.01)
  *B60K 35/60* (2024.01)
  *B60K 35/80* (2024.01)
  *B60R 1/20* (2022.01)
  *B60R 25/30* (2013.01)
  *B60R 25/31* (2013.01)

(52) U.S. Cl.
  CPC ............... *B60K 35/80* (2024.01); *B60R 1/20* (2022.01); *B60R 25/305* (2013.01); *B60R 25/31* (2013.01); *B60Q 2400/50* (2013.01); *B60R 2300/105* (2013.01); *B60R 2300/8073* (2013.01)

(58) Field of Classification Search
  USPC .......................................................... 701/36
  See application file for complete search history.

(56) References Cited

U.S. PATENT DOCUMENTS

| | | | | |
|---|---|---|---|---|
| 2012/0132746 | A1* | 5/2012 | Sizelove | A47C 7/624 |
| | | | | 345/157 |
| 2015/0077327 | A1* | 3/2015 | Pisz | G06F 3/0484 |
| | | | | 345/7 |
| 2017/0305349 | A1* | 10/2017 | Naboulsi | B60R 1/025 |
| 2019/0077372 | A1* | 3/2019 | Greenberg | B60K 35/00 |
| 2019/0126824 | A1* | 5/2019 | Oba | E05F 15/70 |
| 2019/0161121 | A1* | 5/2019 | Greenwood | B62D 13/06 |
| 2019/0164344 | A1* | 5/2019 | Potter | B60Q 1/507 |
| 2020/0307609 | A1* | 10/2020 | Kirsch | H04N 23/56 |
| 2021/0179073 | A1* | 6/2021 | Todor | H04W 4/40 |
| 2022/0083794 | A1* | 3/2022 | Bronte | B60R 11/04 |

\* cited by examiner

METHOD AND APPARATUS FOR PROVIDING USER INTERFACE BASED ON PROJECTION

CROSS-REFERENCE TO RELATED APPLICATIONS

The present application is based on, and claims priority from, Korean Patent Application Number 10-2022-0002626, filed Jan. 7, 2022, the disclosure of which is incorporated by reference herein in its entirety.

TECHNICAL FIELD

The present disclosure relates to a projection-based user interface providing device and method. Specifically, the present disclosure relates to a device and a method for providing a user interface for controlling a vehicle using a projector.

BACKGROUND

The content described below merely provides background information related to the present disclosure and does not constitute the prior art.

With the development of IT technology, various technologies are being researched and applied in various ways to improve user convenience by applying IT technology to a vehicle. The technologies related to an advanced driver assistance system (ADAS) and an autonomous vehicle for user's driving convenience are typical examples.

In order to maximize the convenience and safety of the vehicle user, a vehicle control technology through smooth interaction between the user and the vehicle is required. Accordingly, technology development for various UI/UX (User Interface/User Experience) between vehicle users and vehicles is being actively conducted.

However, technology development related to the interaction between the user and the vehicle is mainly performed with respect to a process while a vehicle is driving, for example, an interaction for controlling a vehicle while driving, an interaction for monitoring a driver's condition, and the like. Accordingly, there is a demand for the development of a user interface through which a user outside the vehicle can remotely control the vehicle more smoothly and conveniently in the process of boarding the vehicle.

SUMMARY

The present disclosure provides a device and method for providing a projection-based user interface which is capable of projecting an interface for interaction between a vehicle and a user on the ground where the vehicle is located, so that the vehicle user can control the vehicle using the projected interface.

The present disclosure is not limited to the problems mentioned above, and other problems not mentioned will be clearly understood by those skilled in the art from the following descriptions.

According to one embodiment of the present disclosure, there is provided a device for providing an interface using a projection, comprising: a first camera for capturing a vehicle user when an approach of the vehicle user to a vehicle is detected; a projector for projecting an interface, related to at least one vehicle control function, preset based on user identification information; a second camera for capturing an area on which the interface is projected; a memory storing one or more instructions; and a processor for executing the instructions to: acquire the user identification information of the vehicle user using the first camera, recognize a user input to the interface using the second camera, and perform a vehicle control corresponding to the interface when the user input is recognized.

According to another embodiment of the present disclosure, there is provided a method for providing an interface using a projection, comprising: acquiring user identification information of a vehicle user using at least one camera when an approach of the vehicle user to a vehicle is detected; projecting an interface, related to at least one vehicle control function, preset based on the user identification information; recognizing a user input to the interface; and performing a vehicle control corresponding to the interface when the user input is recognized.

According to one embodiment, the projection-based user interface providing device and method projects an interface for interaction between a vehicle and a user on the ground where the vehicle is located, and allows the vehicle user to smoothly control the vehicle using the projected interface, improves the safety and convenience of the vehicle user.

DETAILED DESCRIPTION

Figure 1:
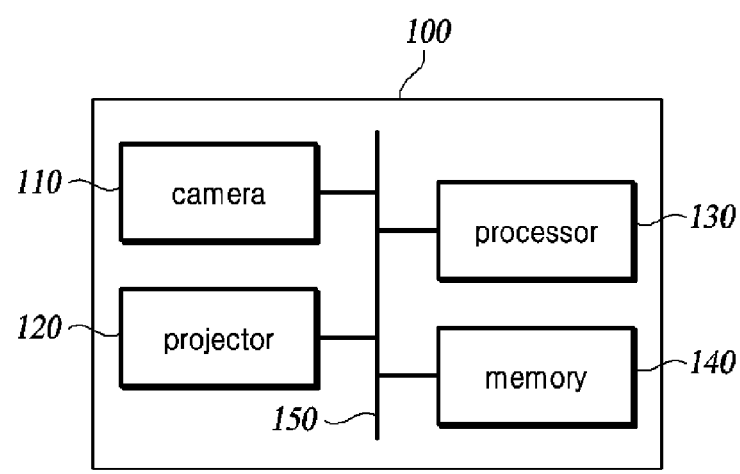
FIG. 1 is a block diagram of a device for providing a user interface according to one embodiment of the present disclosure.

Hereinafter, some embodiments of the present disclosure will be described in detail with reference to exemplary drawings. With regard to the reference numerals of the components of the respective drawings, it should be noted that the same reference numerals are assigned to the same components even though they are shown in different drawings. In addition, in describing the present disclosure, a detailed description of a well-known configuration or function related to the present disclosure, which may obscure the subject matter of the present disclosure, will be omitted.

In addition, terms, such as "first", "second", "i)", "ii)", "a)", "b)", or the like, may be used in describing the components of the present disclosure. These terms are intended only for distinguishing a corresponding component from other components, and the nature, order, or sequence of the corresponding component is not limited by the terms. In the specification, when a unit 'includes' or 'is provided with' a certain component, it means that other components may be further included, without excluding other components, unless otherwise explicitly stated.

Each component of the device or method according to the present disclosure may be implemented as hardware or software, or a combination of hardware and software. In addition, the function of each component may be implemented as software and a microprocessor may execute the function of software corresponding to each component.

FIG. 1 is a block diagram of a device for providing a user interface according to one embodiment of the present disclosure.

Referring to FIG. 1, a device 100 for providing a user interface according to one embodiment of the present disclosure includes a camera 110, a projector 120, a processor 130, and a memory 140. The camera 110, the projector 120, the processor 130, and the memory 140 may mutually transmit data through a bus 150.

According to one embodiment, the user interface providing device 100 may be mounted to a non-autonomous vehicle as well as an autonomous vehicle in order to provide interaction between the vehicle and a user.

The camera 110 includes a first camera that captures an image for identifying a vehicle user approaching the vehicle and a second camera that captures an image for recognizing an input of the vehicle user. Here, each of the first camera and the second camera may include at least one camera mounted at a preset position of the vehicle.

The first camera may be disposed at an appropriate location outside the vehicle to obtain an image of a user approaching the vehicle from outside the vehicle. For example, the first camera for acquiring a forward image from the vehicle may be disposed close to a front windshield inside the vehicle, or around a front bumper or a radiator grill outside the vehicle.

The first camera for acquiring a rearward image from the vehicle may be disposed adjacent to a rear glass inside the vehicle or around a rear bumper, a trunk, or a tail gate outside the vehicle.

The first camera for acquiring a lateral image from the vehicle may be disposed adjacent to at least one of side windows in the vehicle interior, or around a side mirror, a fender, or a door.

When a vehicle user approaching the vehicle is detected, the first camera captures the vehicle user. Here, the vehicle user is a person identified as a vehicle user through one or more preset authentication means among people approaching the vehicle.

For example, when a user equipment carried by a person approaching a vehicle receives a first signal broadcast by the vehicle, the user equipment transmits a preset second signal in response to the first signal. When receiving the second signal, the vehicle identifies the person as the vehicle user and detects the vehicle user's approach. In this case, the user equipment may be a smart key of the corresponding vehicle.

The second camera includes a plurality of cameras that photograph an area on which an interface related to a vehicle control function is projected in order to recognize a user input. The second camera may be disposed at an outer portion of the vehicle to photograph a preset area of the ground onto which each interface is projected in order to determine whether there is a motion of the vehicle user corresponding to the user input in each of the plurality of projected interfaces.

The second camera may include at least one camera disposed at each of a front outer portion and a rear outer portion of the vehicle to photograph an area of the ground on which the interface is projected. However, the present disclosure is not limited thereto, and the second camera may be disposed at the location where the projector 120 is disposed. For example, the number of the second cameras may be the same as the number of the projectors, and the second cameras may be arranged to photograph the areas on which the respective projectors corresponding to the cameras project the interfaces.

The camera 110 may be a mono camera, a stereo camera, an AVM (Around View Monitoring) camera, or a 360 degree camera.

The camera 110 may transmit the captured image to the processor 130.

The projector 120 projects an image on a preset area on the ground where the vehicle is located. The image projected by the projector 120 may be any one of a preset user-specific image and an interface related to at least one vehicle control function.

The projector 120 may be a beam projector installed at at least one preset position on the front outer portion and the rear outer portion of the vehicle. Here, the beam projector may be an LED beam projector or an LED lighting module.

The projector 120 projects the user-specific image corresponding to the identification information of the vehicle user transmitted by the processor 130 onto the front or rear ground of the vehicle. The user-specific image is an arbitrary image set differently depending on vehicle users. In this case, the user-specific image may be an image previously selected by the user, but without being limited thereto, may be an image arbitrarily selected by the user interface providing device 100.

The projector 120 projects the interface on the front or rear ground of the vehicle according to interface information transmitted by the processor 130. The interface information includes information about the number of vehicle control functions of an interface preset for each vehicle user, a location at which the interface is projected, and the shape of the projected interface. The processor 130 may acquire the interface information based on user identification information.

The projector 120 may project an interface related to one or more vehicle control functions preselected according to a vehicle user from among a plurality of vehicle control functions preset according to the interface information. The plurality of preset vehicle control functions may include a function of controlling a plurality of doors of the vehicle and a function of remotely controlling the movement of the vehicle. However, the present disclosure is not limited thereto, and various vehicle control functions may be additionally included. For example, a function for controlling the engine of the vehicle to start may be additionally included.

The processor 130 identifies the vehicle user based on the image acquired by the camera 110. Specifically, the processor 130 identifies the vehicle user from among a plurality of pre-stored users of the corresponding vehicle based on the image acquired by the first camera of the camera 110.

The processor 130 extracts the features of the vehicle user from the image captured by the camera 110 and identifies the matching user by comparing them with previously stored features of a plurality of users for the corresponding vehicle.

When the vehicle user is identified based on the extracted feature, the processor 130 acquires user identification information for the corresponding vehicle user. The user identification information is information about a plurality of vehicle users stored in advance. For example, the user identification information may include at least one of information about a feature on the basis of which the user can be identified from the image, information about a preset user-specific image, and interface information related to a vehicle control function.

The processor 130 transmits preset information about a user-specific image to the projector 120 based on the user identification information and interface information related to a vehicle control function.

The processor 130 recognizes whether there is a user input from the image acquired by the camera 110, specifically, the image acquired by the second camera.

The processor 130 determines whether there is a specific motion of the vehicle user set as a user input in the image acquired by the camera 110. The motion set as the user input may be at least one of a motion in which the vehicle user steps on the area of the interface projected on the ground for a preset time and a motion in which the vehicle user stands on the area of the interface projected on the ground for a preset time. The preset time may be, for example, about 2 seconds.

When the user input is recognized, the processor 130 performs vehicle control corresponding to the interface to which the user input is applied. For example, when a motion corresponding to a user input is recognized in an interface area related to a control function for opening the left front door, the processor 130 performs the vehicle control to open the left front door of the vehicle.

As another example, when a user input is recognized in an interface area related to a function of remotely controlling the movement of the vehicle, the processor 130 may perform the vehicle control to move the vehicle toward the location of the vehicle user. At the same time, the processor 130 may transmit to the projector 120 a control signal that causes the projector 120 to additionally project an image including information about vehicle control on the ground where the vehicle is located. The image including information on vehicle control may be, for example, an image including information on a direction in which the vehicle is currently moving.

The processor 130 may identify a vehicle user using various image processing algorithms. For example, the processor 130 may set at least one region of interest (ROI) with respect to a moving person in the image, and extract the features of the vehicle user from the image within the region of interest.

The processor 130 may identify a vehicle user using a vehicle user identification model learned in advance using a deep learning algorithm. For example, the deep learning algorithm may include a convolutional neural network (CNN). In addition to the convolutional neural network, the vehicle user identification model may be generated according to the learned results in combination with a recurrent neural network (RNN).

The memory 140 may include a volatile memory, a permanent memory, a virtual memory, or other type of memory for storing information used or output by the user interface providing device 100. For example, the memory 140 may include a random access memory (RAM) or a dynamic RAM (DRAM).

The memory 140 may store a program for processing or controlling the processor 130 and various data for the operation of the user interface providing device 100. For example, in the memory 140, the user identification information including at least one of information 5 about features used to identify a vehicle user from an image captured by the camera 110, information about a preset user-specific image, and interface information about vehicle control functions may be stored.

Figure 2:
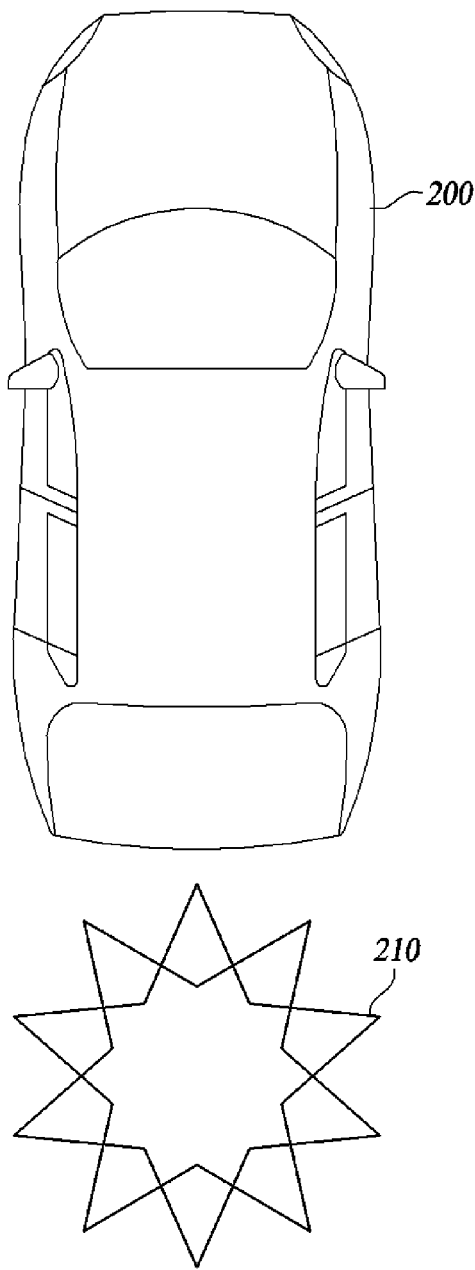
FIG. 2 is a view illustrating a process in which the device for providing a user interface according to one embodiment of the present disclosure projects a user-specific image based on user identification information.

FIG. 2 is a view illustrating a process in which the user interface providing device projects a user-specific image based on user identification information according to one embodiment of the present disclosure.

Referring to FIG. 2, when identifying a vehicle user approaching the vehicle 200, the user interface providing device projects a preset user-specific image 210 for the user on the ground where the vehicle 200 is located.

The location at which the user-specific image 210 is projected may be determined according to the location of the vehicle user on the ground where the vehicle 200 is located. For example, when the vehicle user is approaching from the front of the vehicle, the user-specific image 210 may be projected on the ground in front of the vehicle, and when the vehicle user is approaching from the rear of the vehicle, the user-specific image 210 may be projected on the ground behind the vehicle.

The location at which the user-specific image 210 is projected may vary depending on whether there are obstacles around the vehicle. For example, when the vehicle user is approaching from the rear side of the vehicle, when it is difficult to secure a space on the ground onto which the user-specific image 210 is projected due to obstacles such as other vehicles behind the vehicle, the user interface providing device may project the user-specific image 210 onto the ground at the left rear side or the right rear side of the vehicle 200.

The user-specific image 210 may be an image having a different shape depending on the identified vehicle user. The user-specific image 210 may be an image previously selected by each vehicle user, or may be an image arbitrarily designated by the user interface providing device according to each vehicle user from among a plurality of images.

The vehicle user may recognize the user-specific image 210 projected on the ground, recognize the vehicle 200, and then the location on the ground where the interface for vehicle control is to be projected may be recognized.

Figure 3:
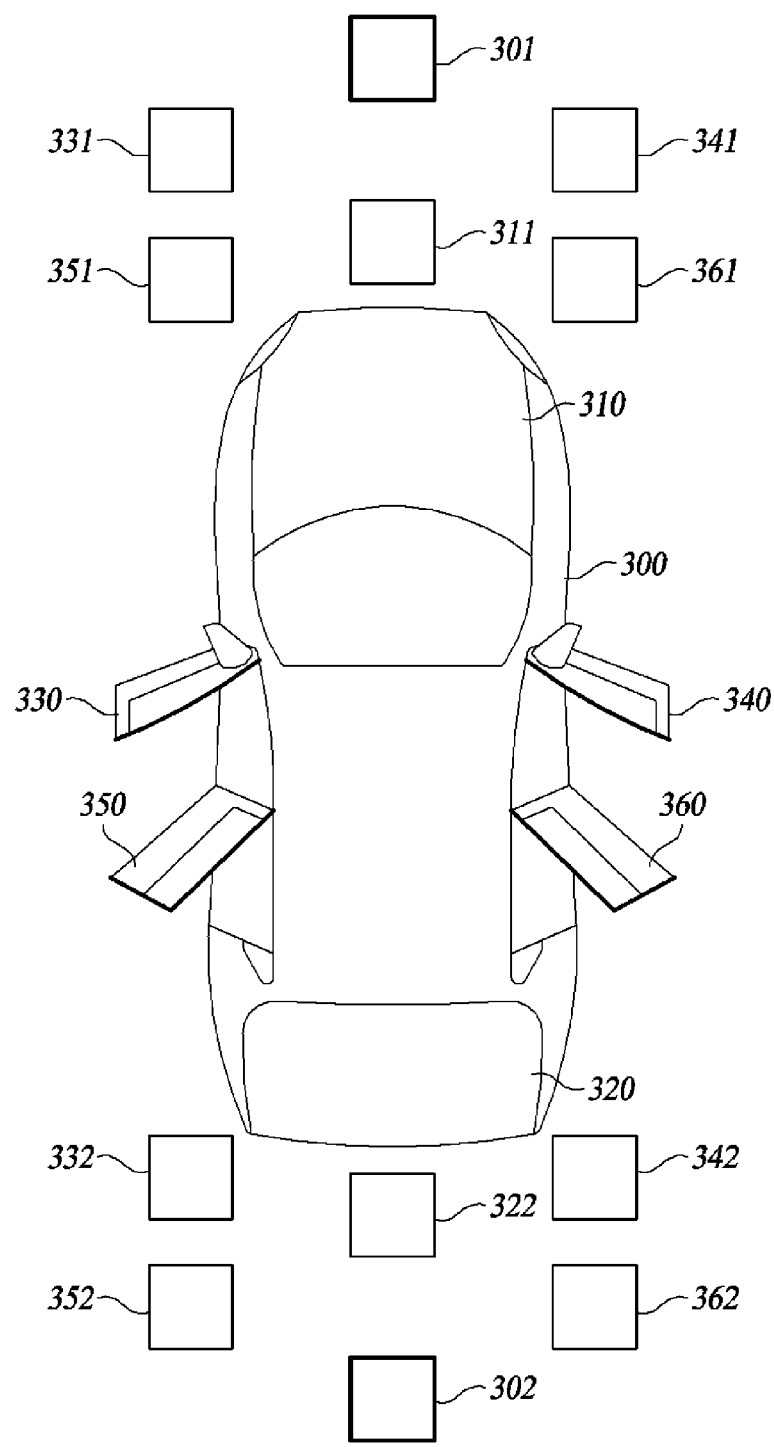
FIG. 3 is a view illustrating an interface related to a vehicle control function projected by the device for providing a user interface according to one embodiment of the present disclosure.

FIG. 3 is a view illustrating an interface related to a vehicle control function projected by a user interface providing device according to one embodiment of the present disclosure.

Referring to FIG. 3, the user interface providing device projects an interface capable of executing a plurality of vehicle functions on the ground at the front side and/or the rear side of the vehicle 300.

When the location of the vehicle user is detected as the location in front of the vehicle 300, an interface related to the function of controlling the door of the vehicle 300 is projected on the ground in front of the vehicle. The interface related to the function of controlling the door of the vehicle 300 includes a left front door interface 331 for automatically opening a left front door 330 and a right front door interface 341 for automatically opening a right front door 340, a left rear door interface 351 for automatically opening a left rear door 350, and a right rear door interface 361 for automatically opening a right rear door 360.

When the vehicle user is in front of the vehicle, a bonnet interface 311 capable of automatically opening a bonnet 310 at the front side of the vehicle may be additionally projected.

On the other hand, when the position of the vehicle user sensed is behind the vehicle 300, an interface related to the function of controlling the door of the vehicle 300 is projected on the ground behind the vehicle. The interface related to the function of controlling the door of the vehicle 300 includes a plurality of door interfaces 332, 342, 352 and 362 for automatically opening the corresponding doors 330, 340, 350 and 360, similarly to the interface projected on the ground in front of the vehicle.

When the vehicle user is positioned behind the vehicle, a tailgate interface 322 capable of automatically opening a tailgate 320 at the rear side of the vehicle may be additionally projected.

The vehicle user interface providing device projects interfaces 301 and 302 related to the function of remotely controlling the movement of the vehicle together with the interfaces related to the function of controlling the doors of the vehicle 300. The function of remotely controlling the movement of the vehicle may be set as a function of remotely controlling a parked vehicle to move it to the location of the vehicle user.

When the vehicle user is in front of the vehicle, the interface 301 related to the function of remotely controlling the movement of the vehicle is projected on the ground in front of the vehicle, and when the vehicle user is positioned behind the vehicle, the interface 302 related to the function of remotely controlling the movement of the vehicle is projected on the ground on the rear side of the vehicle. The interfaces 301 and 302 related to the function of remotely controlling the movement of the vehicle may be projected to a location closer to the vehicle user than the other interfaces projected together.

The vehicle user interface providing device may project a preset interface according to the vehicle user. For example, when the vehicle user approaching the vehicle is identified as a first user, the user interface providing device may project only the interfaces for some doors among the plurality of door interfaces, for example, only the left front door interface and the right front door interface, based on the interface information included in the user identification information for the first user. As another example, when the vehicle user approaching the vehicle is identified as a second user, the user interface providing device may only project interfaces for the function of remotely controlling the movement of the vehicle based on the interface information included in the user identification information for the second user.

The vehicle user interface providing device may project an interface in a preset form according to a vehicle user. With respect to the interfaces projected on the ground, at least one of a projection position of the interface, a shape of the interface, and a color of the interface, as well as the types of the interfaces and the number of the interfaces to be projected, may be previously set according to the vehicle user.

Figure 4A:
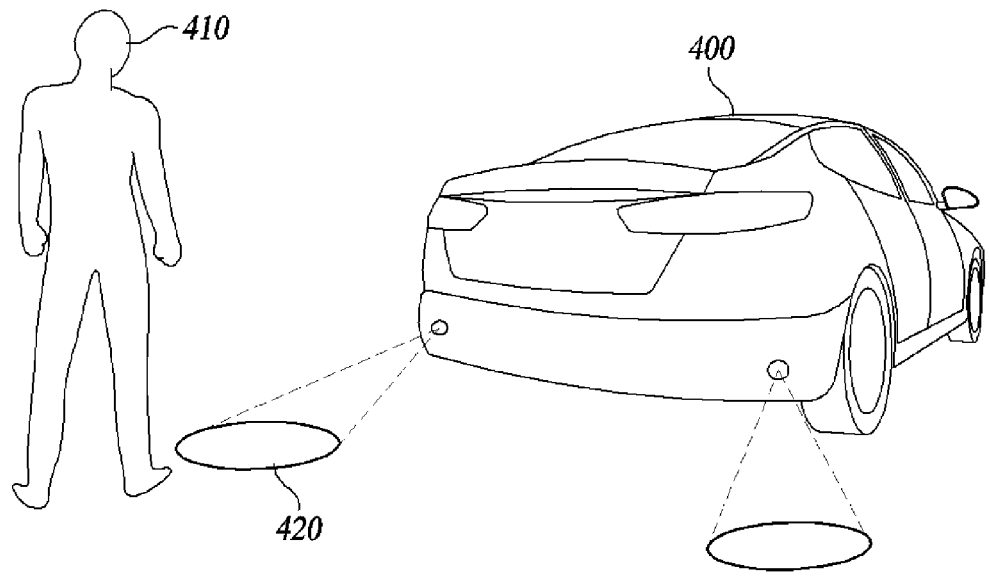
FIGS. 4A and 4B are views for explaining a user input operation of the device for providing a user interface according to one embodiment of the present disclosure.
Figure 4B:
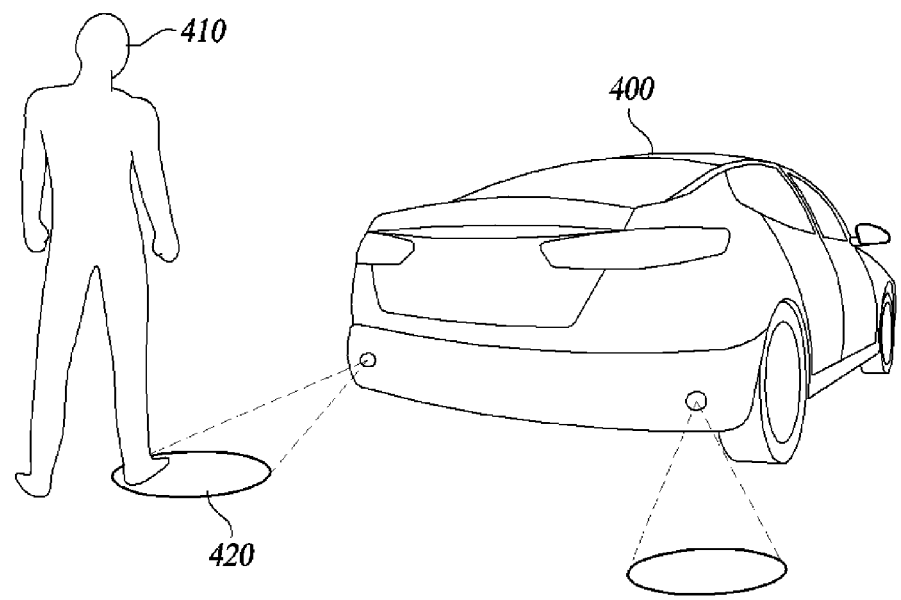

FIGS. 4A and 4B are views for explaining a user input operation of the user interface providing device according to one embodiment of the present disclosure.

Referring to FIG. 4A, a plurality of interfaces 420 related to the control functions of a vehicle 400 are projected on the ground where the vehicle 400 is located. Since the user 410 is located behind the vehicle, the user interface providing device projects the interfaces 420 on the ground on the rear side of the vehicle according to the user's location.

The vehicle user interface providing device monitors whether there is a user input of the user 410 in the interface 420. For example, the user interface providing device may capture an area including the projected interface 420, and when a user's motion corresponding to the user input is recognized in the captured image, it may be determined that there is a user input. In order to monitor whether there is a user input, the user interface providing device may use at least one camera that captures the area on which the interface 420 is projected. However, the present disclosure is not limited thereto, and the motion of the user 410 may be monitored using various sensors such as an ultrasonic sensor and a radar.

Referring to FIG. 4B, the user 410 performs a preset user input motion on the interface 420 to control the vehicle corresponding to the interface 420. The user input motion is set as a motion in which the vehicle user steps on the area of the interface projected on the ground for a preset time period, for example, 2 seconds.

The vehicle user interface providing device determines that there is a user input on the interface 420 when the user 410 steps on the interface 420 for 2 seconds in the image captured by the camera, and controls the vehicle corresponding to the interface 420. For example, when the interface 420 is an interface for opening any one door of the vehicle 400, the corresponding door is automatically opened.

FIGS. 5A to 5D are views for explaining a process of controlling a vehicle according to one embodiment of the present disclosure.

Figure 5A:
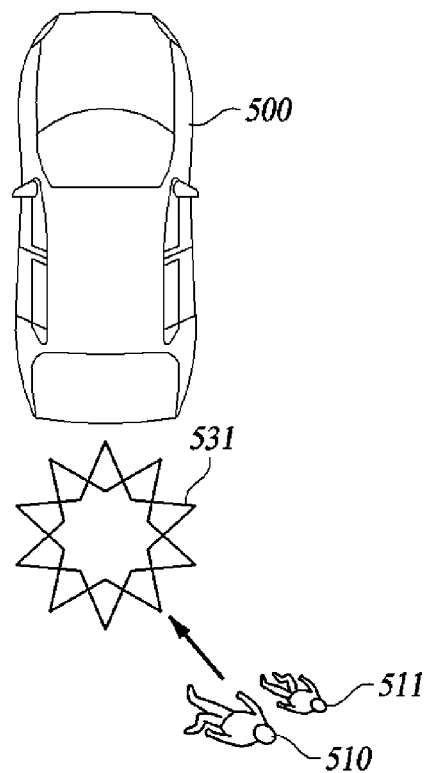
FIGS. 5A to 5D are views for explaining a process of controlling a vehicle according to one embodiment of the present disclosure.

Referring to FIG. 5A, a vehicle user 510 approaches the vehicle 500 together with a passenger 511. The vehicle user 510 and the passenger 511 are approaching from the rear of the vehicle 500.

The vehicle user interface providing device detects the approach of the vehicle user 510. The smart key possessed by the vehicle user 510 receives a signal broadcast by the vehicle 500 and transmits a response signal thereto. When the vehicle 500 receives the response signal, the user interface providing device may detect that the vehicle user 510 is approaching.

When the approach of the vehicle user 510 is detected, the user interface providing device photographs the vehicle user 510 using a camera.

The user interface providing device extracts the features of the vehicle user 510 from the image of the vehicle user 510 and identifies the vehicle user 510 based on the extracted features and pre-stored features of a plurality of users.

When the vehicle user 510 is identified, the user interface providing device projects a user-specific image 531 on the ground behind the vehicle 500 based on user identification information corresponding to the vehicle user 510.

Figure 5B:
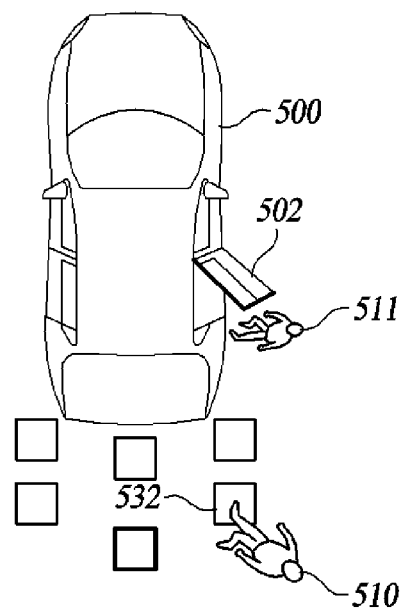

Referring to FIG. 5B, the user interface providing device projects an interface related to a vehicle control function. The interface related to the vehicle control function is projected on the ground behind the vehicle 500.

The vehicle user 510 steps on a right rear door interface 532 with one foot to open a door for a seat on which the passenger 511 intends to seat. The user interface providing device recognizes a user input for the right rear door interface 532 from the motion of the vehicle user 510 and controls the vehicle to open a right rear door 502. The passenger 511 may board the vehicle 500 through the automatically opened right rear door 502.

Figure 5C:
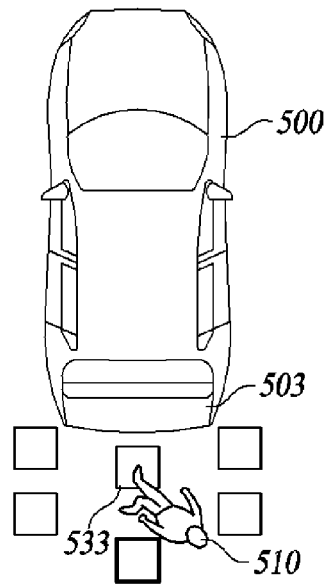

Referring to FIG. 5C, for example, when opening a tailgate 503 of the vehicle 500 to load luggage or the like in a storage space at the rear of the vehicle, the vehicle user 510 steps on a tailgate interface 533 with one foot. The user interface providing device recognizes a user input for the tailgate interface 533 from the motion of the vehicle user 510 and controls the vehicle to open the tailgate 503. The vehicle user 510 may load luggage or the like in the vehicle 500 through the automatically opened tailgate 503.

Figure 5D:
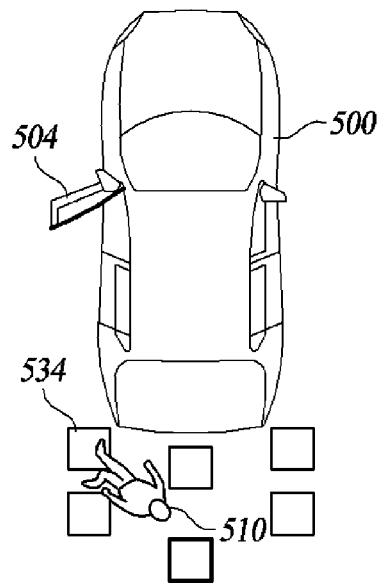

Referring to FIG. 5D, the vehicle user 510 steps on a left front door interface 534 with one foot to get on the driver's seat located in the front left side of the vehicle. The user interface providing device recognizes a user input for the left front door interface 534 and controls the vehicle to automatically open a left front door 504. The vehicle user 510 may get in the vehicle 500 through the opened left front door 504.

FIGS. 6A to 6E are views for explaining a process of controlling a vehicle according to another embodiment of the present disclosure.

Figure 6A:
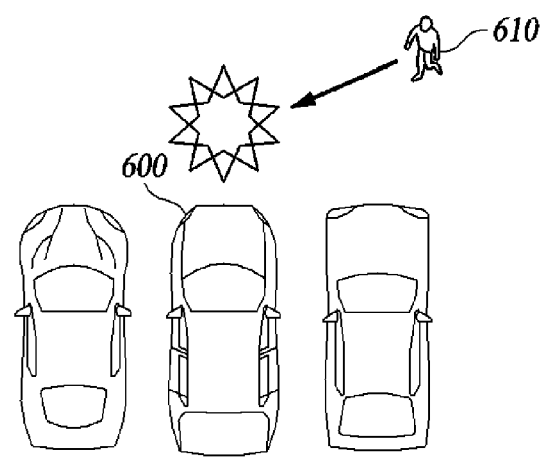
FIGS. 6A to 6E are views for explaining a process of controlling a vehicle according to another embodiment of the present disclosure.

Referring to FIG. 6A, a vehicle user 610 approaches a vehicle 600. When the approach of the vehicle user 610 is detected, the user interface providing device extracts features from the image of the vehicle user 610 captured using a camera installed at a preset location of the vehicle 600, and acquires user identification information for the vehicle user 610.

The user identification information for the vehicle user 610 may be information about the vehicle user 610 currently approaching the vehicle 600 among a plurality of pre-stored user identification information. For example, the user identification information may include setting information on a user-specific image preset for the vehicle user 610.

The user interface providing device projects the user-specific image for the vehicle user 610 on the ground in front of the vehicle 600 based on the user identification information.

The left and right spaces of the vehicle 600 may be narrow due to other vehicles parked on the left and right sides of the vehicle 600, and it may be difficult for the vehicle user 610 to open the door and secure a space for boarding the vehicle 600. Accordingly, the vehicle user 610 needs to remotely control the parked vehicle 600 to move the vehicle 600 to a desired location.

Figure 6B:
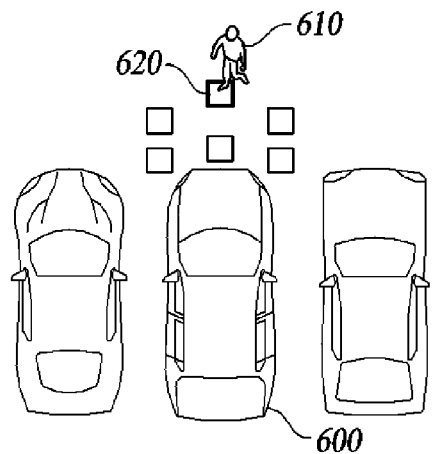

Referring to FIG. 6B, the user interface providing device projects the interfaces related to the vehicle control functions on the ground in front of the vehicle 600. The interfaces related to the vehicle control function may include an interface related to the function of remotely controlling the movement of the vehicle, for example, a remote control interface 620 related to the function of remotely controlling the parked vehicle 600 to move to the location of the vehicle user 610.

The vehicle user 610 steps on the remote control interface 620 with one foot. The user interface providing device recognizes a user input from the motion of the vehicle user 610 and performs the movement control of the parked vehicle 600.

Figure 6C:
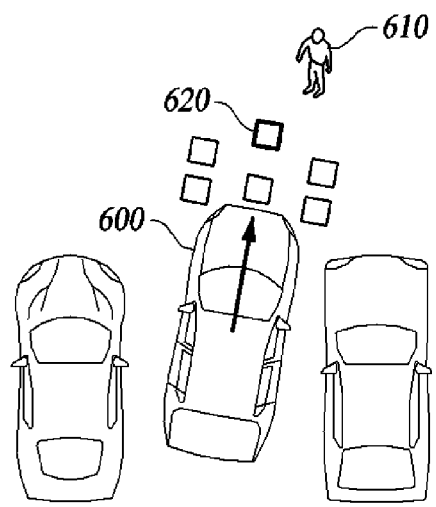

Referring to FIG. 6C, the vehicle user 610 retreats to the desired location after performed the motion of the user input on the remote control interface 620. The user interface providing device controls the vehicle 600 to move toward the vehicle user 610 while maintaining a preset distance from the vehicle user 610. The preset distance may be set as a distance from the vehicle 600 to an arbitrary point other than an area in which the interfaces related to the vehicle control functions are set to be projected.

In order to indicate that the vehicle 600 is moving to the location of the vehicle user 610, the vehicle user interface providing device may project an image including information about the moving direction of the vehicle on the ground in front of the vehicle. The image including the moving direction information of the vehicle may be projected on the location where the remote control interface 620 is projected, but the present disclosure is not limited thereto. For example, the user interface providing device may project an image in the form of an animation in which the remote control interface 620 repeats and moves in an arbitrary cycle in the direction in which the vehicle 600 moves.

Figure 6D:
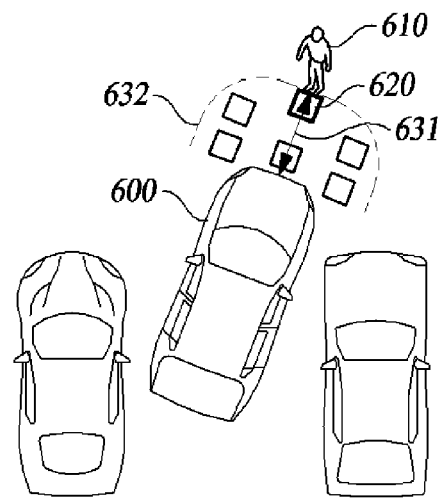

Referring to FIG. 6D, when the vehicle 600 moves to a location desired by the vehicle user 610 and the distance between the vehicle user 610 and the vehicle 600 reaches a preset distance 631, the user interface providing device controls the vehicle 600 to stop.

The vehicle user interface providing device terminates the remote control of the vehicle 600 when the vehicle user 610 stays in an area 632 set to project the interfaces related to the vehicle control functions for a preset time. The preset time may be set to, for example, 3 seconds.

Figure 6E:
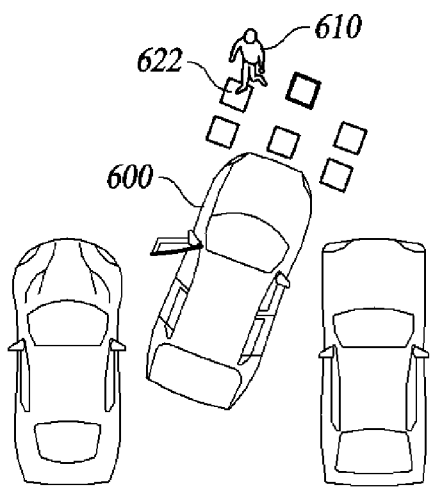

Referring to FIG. 6E, the vehicle user 610 steps on a left front door interface 622 with one foot to get on the driver's seat located in the front left of the vehicle 600. The user interface providing device recognizes a user input for the left front door interface 622 and controls the vehicle 600 to automatically open the left front door 602.

Figure 7:
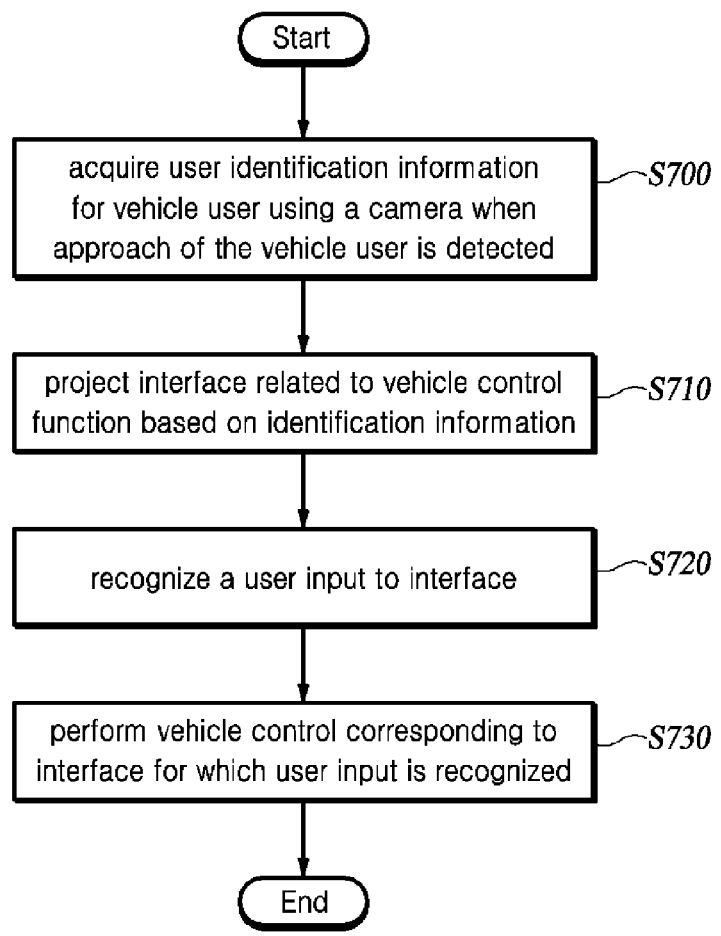
FIG. 7 is a flowchart illustrating a method of providing a user interface according to one embodiment of the present disclosure.

FIG. 7 is a flowchart illustrating a user interface providing method according to one embodiment of the present disclosure.

Referring to FIG. 7, when an approach of a vehicle user is detected, the user interface providing device acquires user identification information for the vehicle user using a camera (S700).

The vehicle user interface providing device captures an image of the vehicle user using at least one camera mounted at a preset position of the vehicle in order to identify the vehicle user approaching the vehicle. The vehicle user's approach detection may be performed using a transmission/reception signal between the vehicle and a user terminal possessed by the vehicle user.

The vehicle user interface providing device identifies which user the vehicle user is, among a plurality of pre-stored users of the corresponding vehicle, based on the image captured by the camera. The user interface providing device extracts the vehicle user's features from the image and compares the vehicle user's features with the pre-stored features of the plurality of users of the corresponding vehicle to identify the vehicle user having the matching features.

The vehicle user interface providing device may extract the features of the vehicle user and identify the user using various image processing algorithms. For example, a vehicle user may be identified using a vehicle user identification model learned in advance using a deep learning algorithm. The deep learning algorithm may include a convolutional neural network (CNN) or the like.

When the vehicle user is identified based on the extracted features, the user interface providing device acquires user identification information for the corresponding vehicle user. The user identification information is setting information about a plurality of vehicle users stored in advance for the vehicle. For example, the user identification information may include at least one of information about features on the basis of which the user can be identified from the image, information about preset user-specific images, and interface information related to vehicle control functions.

The vehicle user interface providing device projects interfaces related to the vehicle control functions based on the acquired identification information (S710).

The vehicle user interface providing device projects the interface related to the vehicle control function onto a preset area on the ground where the vehicle is located using a projector installed at at least one preset position at the front side and the rear side of the vehicle. The preset area may be on the ground in front or behind the vehicle, but the present disclosure is not limited thereto, and when another vehicle or obstacle is detected in front of or behind the vehicle, the preset area may be set to an area on the left or right side of the vehicle where no vehicle or obstacle exists.

The vehicle user interface providing device projects the interface related to the vehicle control function based on user identification information of the vehicle user. The interfaces includes an interface related to one or more vehicle control functions preselected according to the vehicle user from among a plurality of vehicle control functions set in advance. The user identification information of the vehicle user includes the interface information related to the vehicle control function set according to the vehicle user.

Before projecting the interface related to the vehicle control function, the vehicle user interface providing device may project a user-specific image on the ground in front of or behind the vehicle based on the identification information of the vehicle user. The user-specific images are arbitrary images set differently depending on vehicle users. The user-specific image may be an image previously selected by the user, but without being limited thereto, may be an image arbitrarily set by the user interface providing device.

The vehicle user interface providing device recognizes a user input to the interface (S720).

The vehicle user interface providing device includes a plurality of cameras disposed at outer portions of the vehicle to recognize a user input to the interface. The plurality of cameras are disposed at the outer portions of the vehicle so as to photograph the area on the ground on which the interface is projected.

When there is a motion preset as the user input of the vehicle user in an image captured by the camera, the user interface providing device recognizes that there is the user input in the corresponding interface. The motion preset as the user input may be at least one of a motion in which the vehicle user steps on the area of the interface projected on the ground for a preset time and a motion in which the vehicle user stands on the area of the interface projected on the ground for a preset time.

The vehicle user interface providing device performs vehicle control corresponding to the interface for which the user input is recognized (S730).

For example, when the interface for which the user input is recognized is an interface for a function of opening any one door of the vehicle, the user interface providing device controls the vehicle so that the corresponding door of the vehicle is automatically opened. When the interface for which the user input is recognized is an interface related to a function of remotely controlling the movement of the vehicle, the user interface providing device controls the vehicle to move toward the location of the vehicle user.

Various implementations of the systems and techniques described herein may be realized by digital electronic circuits, integrated circuits, field programmable gate arrays (FPGAs), application specific integrated circuits (ASICs), computer hardware, firmware, software, and/or combination thereof. These various implementations may include an implementation by one or more computer programs executable on a programmable system. The programmable system includes at least one programmable processor (which may be a special purpose processor or a general-purpose processor) coupled to a storage system, at least one input device, and at least one output device to receive and transmit data and instructions therefrom and thereto. Computer programs (also known as programs, software, software applications or codes) contain instructions for the programmable processor and are stored on a non-transitory "computer-readable medium".

Although it is described that each process is sequentially executed in the flowchart/timing diagram of the present specification, this is merely illustrative of the technical idea of one embodiment of the present disclosure. In other words, since an ordinary skilled person in the art to which these embodiments of the present disclosure pertain may make various modifications and changes by changing the order described in the flowchart/timing diagram without departing from the essential characteristics of the present disclosure or performing in parallel one or more of the steps, the flowchart/timing diagram is not limited to a time-series order.

The above description is merely illustrative of the technical idea of the present embodiment, and various modifications and variations will be possible without departing from the essential characteristics of the present embodiment by those skilled in the art to which the present embodiment belongs. Accordingly, the present embodiment is intended to explain rather than limit the technical spirit of the present embodiment, and the scope of the technical spirit of the present embodiment is not limited by these embodiments. The protection scope of this embodiment should be interpreted by the following claims, and all technical ideas within the scope equivalent thereto should be interpreted as being included in the scope of the present embodiment.

What is claimed is:

1. A device for providing an interface using a projection, comprising:
    a first camera for capturing a vehicle user when an approach of the vehicle user to a vehicle is detected;
    a projector for projecting one or more interfaces on a ground where the vehicle is located based on user identification information, wherein each interface corresponds to at least one vehicle control function, and each vehicle control function is selectively executed by interaction between the vehicle user and corresponding interface;
    a second camera for capturing an area on which the one or more interfaces are projected;
    a memory storing one or more instructions; and
    a processor for executing the instructions to: identify the vehicle user based on an image captured by the first camera, recognize a user input to a first interface among the one or more interfaces using the second camera, and perform a vehicle control corresponding to the first interface where the user input is recognized,
    wherein, the processor determines the number of the interfaces to be projected on the ground, or a position on the ground where each interface is projected, wherein the number or the position is determined based on user identification information of the identified vehicle user,
    wherein, the processor recognizes the user input to a specific interface corresponding to a vehicle control function associated with vehicle movement,
    wherein, the projector further projects an image onto the ground indicating a direction of movement of the vehicle, based on recognizing the user input to the first interface corresponding to the vehicle control function associated with vehicle movement, and
    wherein, the processor controls, based on recognizing the user input to the specific interface, the vehicle to move in a direction toward the vehicle user, and to follow the vehicle user until a distance between the vehicle and the vehicle user becomes less than a predetermined distance.

2. The device of claim 1, wherein the processor extracts at least one feature from an image of the vehicle user captured by the first camera, and acquires one piece of user identification information corresponding to the feature from among a plurality of pieces of pre-stored user identification information.

3. The device of claim 1, wherein the projector projects a preset user-specific image on the ground where the vehicle is located based on the user identification information before projecting the one or more interfaces.

4. The device of claim 1, wherein the processor further determines, based on the user identification information, a form of each interface to be projected.

5. The device of claim 1, wherein the processor recognizes the user input based on a preset motion of the vehicle user photographed using the second camera.

6. The device of claim 1, wherein the processor determines, from among the one or more interfaces projected on the ground, the first interface based on recognizing that the vehicle user has continuously remained on a certain interface for a preset time.

7. The device of claim 1, wherein the one or more interfaces include at least one of an interface corresponding to a function of controlling a door of the vehicle, or an interface corresponding to a function of remotely controlling a movement of the vehicle.

8. The device of claim 1, wherein while the vehicle control is performed, the projector projects an image including information about the vehicle control currently being performed on the ground where the vehicle is located.

9. The device of claim 3, wherein the user-specific image is projected in a direction facing the vehicle user approaching to the vehicle, allowing the vehicle user to recognize the vehicle and the area where the one or more interfaces will be projected.

10. The device of claim 3, wherein a location on the ground where the user-specific image is projected is adjusted based on whether there are obstacles around the vehicle.

11. The device of claim 1, wherein the image is projected onto the position on the ground where the first interface was previously projected.

12. A method for providing an interface using a projection, comprising:
identifying a vehicle user based on an image captured by at least one camera when an approach of the vehicle user to a vehicle is detected;
projecting one or more interfaces on a ground where the vehicle is located based on the user identification information, wherein each interface corresponds to at least one vehicle control function, and each vehicle control function is selectively executed by interaction between the vehicle user and corresponding interface;
recognizing a user input to a first interface among the one or more interfaces; and
performing a vehicle control corresponding to the first interface where the user input is recognized,
wherein, the projecting includes determining the number of the interfaces to be projected on the ground, or a position where each interface is projected, wherein the number or the position is determined based on user identification information of the identified vehicle user,
wherein, the recognizing includes recognizing the user input to a specific interface corresponding to a vehicle control function associated with vehicle movement,
wherein, the projecting further includes projecting an image onto the ground indicating a direction of movement of the vehicle, based on recognizing the user input to the first interface corresponding to a vehicle control function associated with vehicle movement, and
wherein, the performing the vehicle control includes controlling, based on recognizing the user input to the specific interface, the vehicle to move in a direction toward the vehicle user, and to follow the vehicle user until a distance between the vehicle and the vehicle user becomes less than a predetermined distance.

13. The method of claim 12, wherein the acquiring of user identification information for a vehicle user using at least one camera includes:
extracting at least one feature from an image of the vehicle user captured by a first camera mounted on the vehicle; and
acquiring one piece of user identification information corresponding to the feature from among a plurality of pieces of pre-stored user identification information.

14. The method of claim 12, wherein the projecting includes, before projecting the one or more interfaces, projecting a user-specific image preset based on the identification information on the ground where the vehicle is located.

15. The method of claim 12, wherein the projecting further includes determining, based on the user identification information, a form of each interface to be projected.

16. The method of claim 12, wherein the recognizing of the user input includes:
recognizing the user input based on a preset motion of the vehicle user photographed using a second camera mounted on the vehicle.

17. The method of claim 12, wherein the recognizing of the user input includes:
determines, from among the one or more interfaces projected on the ground, the first interface based on recognizing that the vehicle user has continuously remained on a certain interface for a preset time.

18. The method of claim 12, wherein the one or more interfaces includes at least one of an interface corresponding to a function of controlling a door of the vehicle and an interface corresponding to a function of remotely controlling a movement of the vehicle.

19. The method of claim 12, wherein the performing of the vehicle control corresponding to the interface includes:
projecting an image including information about the vehicle control currently being performed on the ground where the vehicle is located while the vehicle control is being performed.

* * * * *